(12) United States Patent
Michael et al.

(10) Patent No.: US 12,265,192 B2
(45) Date of Patent: Apr. 1, 2025

(54) RECONSTRUCTING CARBONATE SEDIMENT TRANSPORT AND PATHWAYS IN THE GEOLOGICAL RECORD

(71) Applicant: SAUDI ARABIAN OIL COMPANY, Dhahran (SA)

(72) Inventors: Nikolaos A. Michael, Dhahran (SA); Rainer Zuhlke, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 308 days.

(21) Appl. No.: 17/819,546

(22) Filed: Aug. 12, 2022

(65) Prior Publication Data

US 2024/0053506 A1 Feb. 15, 2024

(51) Int. Cl.
| | |
|---|---|
| *G01V 20/00* | (2024.01) |
| *E21B 49/02* | (2006.01) |
| *G01V 1/28* | (2006.01) |

(52) U.S. Cl.
CPC .............. *G01V 20/00* (2024.01); *G01V 1/282* (2013.01); *E21B 49/02* (2013.01); *E21B 2200/20* (2020.05); *G01V 2210/66* (2013.01)

(58) Field of Classification Search
None
See application file for complete search history.

(56) References Cited

U.S. PATENT DOCUMENTS

| | | |
|---|---|---|
| 6,115,671 A | 9/2000 | Fordham et al. |
| 7,043,367 B2 | 5/2006 | Granjeon |
| 11,199,640 B2 | 12/2021 | Michael et al. |
| 2010/0332210 A1 | 12/2010 | Birdwell et al. |
| 2013/0080066 A1 | 3/2013 | Al-Dossary et al. |
| 2016/0231450 A1 | 8/2016 | Shao et al. |
| 2018/0037797 A1 | 2/2018 | Brady et al. |
| 2018/0127632 A1 | 5/2018 | Amanullah |
| 2018/0266197 A1 | 9/2018 | Amanullah et al. |
| 2018/0335530 A1 | 11/2018 | Wu et al. |

(Continued)

FOREIGN PATENT DOCUMENTS

| | | |
|---|---|---|
| WO | 2010/120492 A2 | 10/2010 |
| WO | 2018165262 A1 | 9/2018 |

OTHER PUBLICATIONS

Anomneze, David O., et al. "Description and interpretation of fault-related sedimentation and controls on shelf-edge deltas: implication on sand transportation to the basin floor in parts of Eastern Niger Delta." Journal of Petroleum Exploration and Production Technology 10 (2020): 1367-1388. (Year: 2020).*

(Continued)

*Primary Examiner* — Raymond L Nimox
(74) *Attorney, Agent, or Firm* — Osha Bergman Watanabe & Burton LLP

(57) ABSTRACT

A method of enhancing a gross depositional environment (GDE) map of a subsurface formation. The method includes obtaining the GDE map of the subsurface formation, including a lithology map of a plurality of lithotypes and obtaining a paleo-bathymetric map of the subsurface formation. The method further includes assigning an inverse mobility for each of the lithotypes and determining, using a computer processor, an enhanced GDE map based, at least in part, on the GDE map, the paleo-bathymetric map, and the inverse mobility for each of the lithotypes.

15 Claims, 9 Drawing Sheets

(56) References Cited

U.S. PATENT DOCUMENTS

| | | | |
|---|---|---|---|
| 2020/0158898 A1* | 5/2020 | Le Guern | G01V 1/345 |
| 2020/0355839 A1 | 11/2020 | Jeong et al. | |
| 2020/0370426 A1 | 11/2020 | Dugas | |
| 2021/0389498 A1 | 12/2021 | Michael | |
| 2022/0260746 A1 | 8/2022 | Al-Malki et al. | |

OTHER PUBLICATIONS

Flores, J. S. "Process-based modelling of the Brent delta: Influence of paleobathymetry from the Oseberg Fm. pinch out on the wave dominated Brent delta progradation. North Sea Norwegian sector-Huldra field." (2011). (Year: 2011).*

Gomes, Jorge S., et al. "Carbonate reservoir rock typing-the link between geology and SCAL." Abu Dhabi international petroleum exhibition and conference. SPE, 2008. (Year: 2008).*

Office Action issued in U.S. Appl. No. 17/174,625, issued Oct. 24, 2022 (43 pages).

Anomneze, D.O et al., "Description and interpretation of fault-related sedimentation and controls on shelf-edge deltas: implication on sand transportation to the basin floor in parts of Eastern Niger Delta," Journal of Petroleum Exploration and Production Technology, vol. 10, No. 4, pp. 1367-1388, Feb. 15, 2020 (22 pages).

Flores, J.S., "Process-Based Modelling of the Brent Delta: Influence of paleobathymetry from the Oseberg Fm. pinch out on the wave dominated Brent Delta progradation. North Sea Norwegian Sector-Huldra Field," AES/TG/11-18, TU Delft Section for Geotechnology, pp. 1-103, Aug. 4, 2011 (103 pages).

Gomes, J.S. et al., "SPE 118284: Carbonate Reservoir Rock Typing—The Link between Geology and SCAL," Abu Dhabi International Petroleum Exhibition and Conference, Society of Petroleum Engineers, pp. 1-14, Nov. 3, 2008 (14 pages).

International Search Report issued in corresponding International Application No. PCT/US2023/029859; mailed Oct. 30, 2023 (6 pages).

Written Opinion of the International Searching Authority issued in corresponding International Application No. PCT/US2023/029859; dated Oct. 30, 2023 (11 pages).

Embry, Ashton et al., "Alate Devonian reef tract on northeastern Banks Island, N.W.T.", Bulletin of Canadian Petroleum Geology, vol. 19, No. 4, pp. 730-781, 1971 (53 pages).

Gao, Shu, "A Fortran Program for Grain-Size Trend Analysis to Define Net Sediment Transport Pathways", Computers & Geosciences, vol. 22, No. 4, pp. 449-452, 1996 (4 pages).

Gao, Shu et al., "Net sediment transport patterns inferred from grain-size trends, based upon definition of 'transport vectors'", Sedimentary Geology, vol. 81, Iss. 1-2, pp. 47-60, 1992 (14 pages).

Allen, P. A. et al., "The sedimentary basin-fill", Part 3, Basin Analysis: Principles and Application to Petroleum Play Assessment, 3rd Edition, Wiley-Blackwell, pp. 224-369, 2013 (146 pages).

Richards, P. L. et al, "Delineating Source Areas for Runoff in Depressional Landscapes: Implications for Hydrologic Modeling", J. Great Lakes Res. vol. 30, No. 1, pp. 9-21, 2004 (13 pages).

Whittaker, A. C. et al., "Decoding downstream trends in stratigraphic grain size as a function of tectonic subsidence and sediment supply", Geological Society of America Bulletin, vol. 123, Iss. 708, pp. 1363-1382, 2011 (21 pages).

Allen, P.A. et al., "The Qs problem: Sediment volumetric balance of proximal foreland basin systems", Sedimentology, vol. 60, Iss. 1, pp. 102-130, 2013 (29 pages).

Michael, N.A. et al., "The Functioning of Sediment Routing Systems Using a Mass Balance Approach: Example from the Eocene of the Southern Pyrenees", Journal of Geology, vol. 121, pp. 581-606, 2013 (26 pages).

Dunham, R. J., "Classification of Carbonate Rocks According to Depositional Texture", In: Ham, W.E., Ed., Classification of Carbonate Rocks, AAPG, pp. 108-121, 1962 (14 pages).

\* cited by examiner

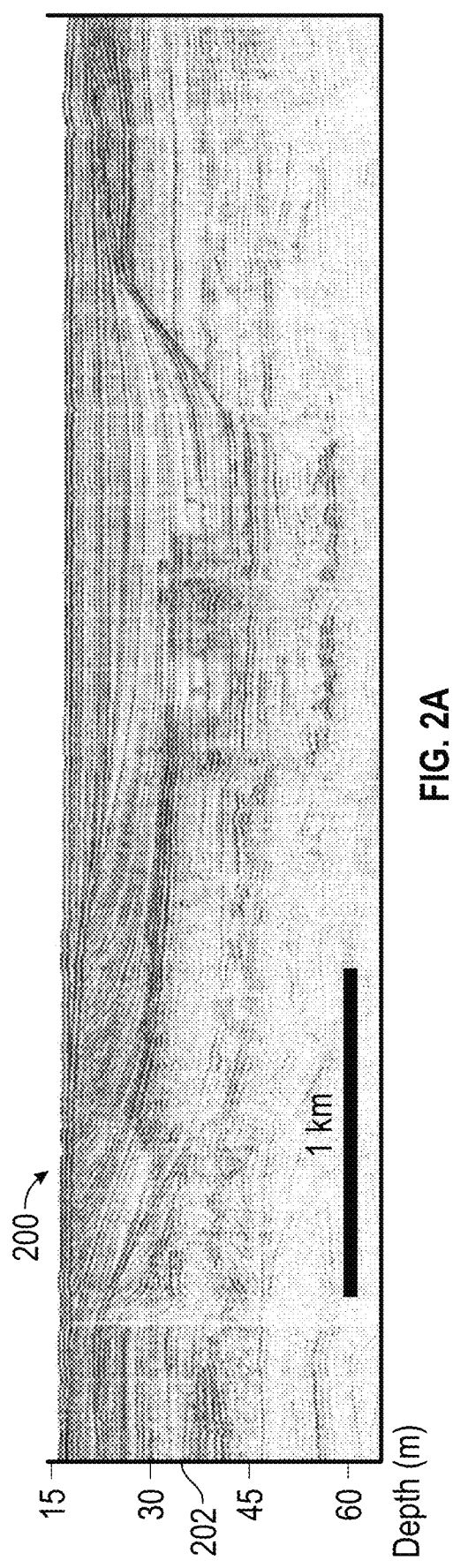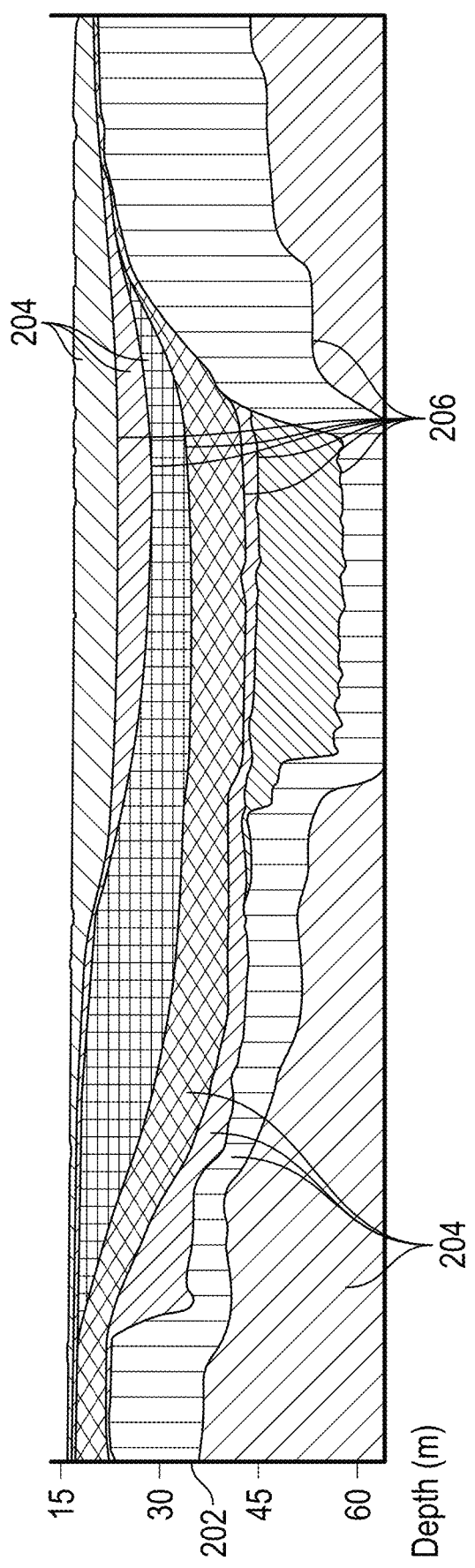
FIG. 2A
FIG. 2B

RECONSTRUCTING CARBONATE SEDIMENT TRANSPORT AND PATHWAYS IN THE GEOLOGICAL RECORD

BACKGROUND

Oil and gas extraction from subsurface rock formations requires the drilling of wells using drilling rigs mounted on the ground or on offshore rig platforms. Once drilled, the wells may access hydrocarbon reservoirs. Reservoir characterization, such as assessments of reservoir quality, models of subsurface regions of interest, and well-site planning, among other things, may be conducted using lithology maps, Gross Depositional Environment (GDE) maps, and 3D digital paleo-bathymetric maps, which are produced with data from a plurality of sources.

An important component, that may be integrated into GDE maps, is the modeling of sediment trajectories. Sediment trajectories include the transportation mechanisms and pathways of sediment. For siliciclastic rocks, where sediment is typically transported from a source located in a continental high to a basin located in a continental low such as a marine realm, the sediment transport is generally governed by the energy of the transportation medium and the grain size of the sediment. However, for carbonate sedimentary systems, where the sediment primarily develops in-situ by chemical, biological, or combined precipitation, sediment trajectories are not well-understood. Consequently, carbonate sedimentary trajectories are not currently incorporated into GDE maps.

Reservoir characterization, assessments of reservoir quality, well-site planning, and planned wellbore trajectories may be improved by inclusion of carbonate sediment in GDE maps.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

One or more embodiments disclosed herein generally relate to a method of enhancing a gross depositional environment (GDE) map of a subsurface formation. The method includes obtaining the GDE map of the subsurface formation, including a lithology map of a plurality of lithotypes and obtaining a paleo-bathymetric map of the subsurface formation. The method further includes assigning an inverse mobility for each of the lithotypes and determining, using a computer processor, an enhanced GDE map based, at least in part, on the GDE map, the paleo-bathymetric map, and the inverse mobility for each of the lithotypes.

One or more embodiments disclosed herein generally relate to a non-transitory computer readable medium storing instructions executable by a computer processor, the instructions including functionality for receiving a gross depositional environment (GDE) map of a subsurface region of interest, including a lithology map of a plurality of lithotypes and receiving a paleo-bathymetric map of a subsurface formation. The instructions further include functionality for assigning an inverse mobility for each of the lithotypes and determining an enhanced GDE map based, at least in part, on the GDE map, the paleo-bathymetric map, and the inverse mobility for each of the lithotypes.

One or more embodiments disclosed herein generally relate to a system, where the system includes: a gross depositional environment (GDE) map of a subsurface formation, including a lithology map of a plurality of lithotypes; a paleo-bathymetric map of the subsurface formation; an inverse mobility for each of the lithotypes; and a computer comprising one or more computer processors and a non-transitory computer readable medium. The computer is configured to determine an enhanced GDE map based, at least in part, on the GDE map, the paleo-bathymetric map, and the inverse mobility for each of the lithotypes. The computer is further configured to determine a subsurface model based, at least in part, on the enhanced gross depositional map. The system further includes a wellbore planning system configured to plan a well-site location and a wellbore trajectory using based, at least in part, on the subsurface model and a drilling system, configured to drill a wellbore guided by the planned wellbore trajectory.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 2A and 2B depict elements of a seismic image in accordance with one or more embodiments.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments disclosed herein relate to a method for analyzing transport and pathways of carbonate sediment in the geological past. The method is based on an index that describes the inverse of the mobility of carbonate sediment, not its grain size. To provide total carbonate sediment transport volumes, inverse mobility gradients and bathymetric gradients are combined. Both the novel index and the inverse mobility index are scaled to the bathymetric gradients in the geological area of interest. The calculated sediment transport directions reflect the paleo bathymetry and the inverse mobility distribution of ancient carbonate rocks.

In one or more embodiments, the method involves assigning a mobility index to carbonate lithotypes and groups of lithotypes: a) boundstone, b) grainstone and packstone, c) wackestone and mudstone and d) total; using the lithotype distribution to calculate the logarithm of the inverse mobility gradient per group of lithotypes in the area of interest; transforming paleo-bathymetry to bathymetric gradients; scaling the logarithm of the inverse mobility index to the bathymetric gradients; combining bathymetric and logarithm of the inverse mobility gradients per lithology group; generating total sediment transport directions per lithology group; and comparing the output to GDE maps to the optimize the geological and reservoir quality prediction.

Figure 1:
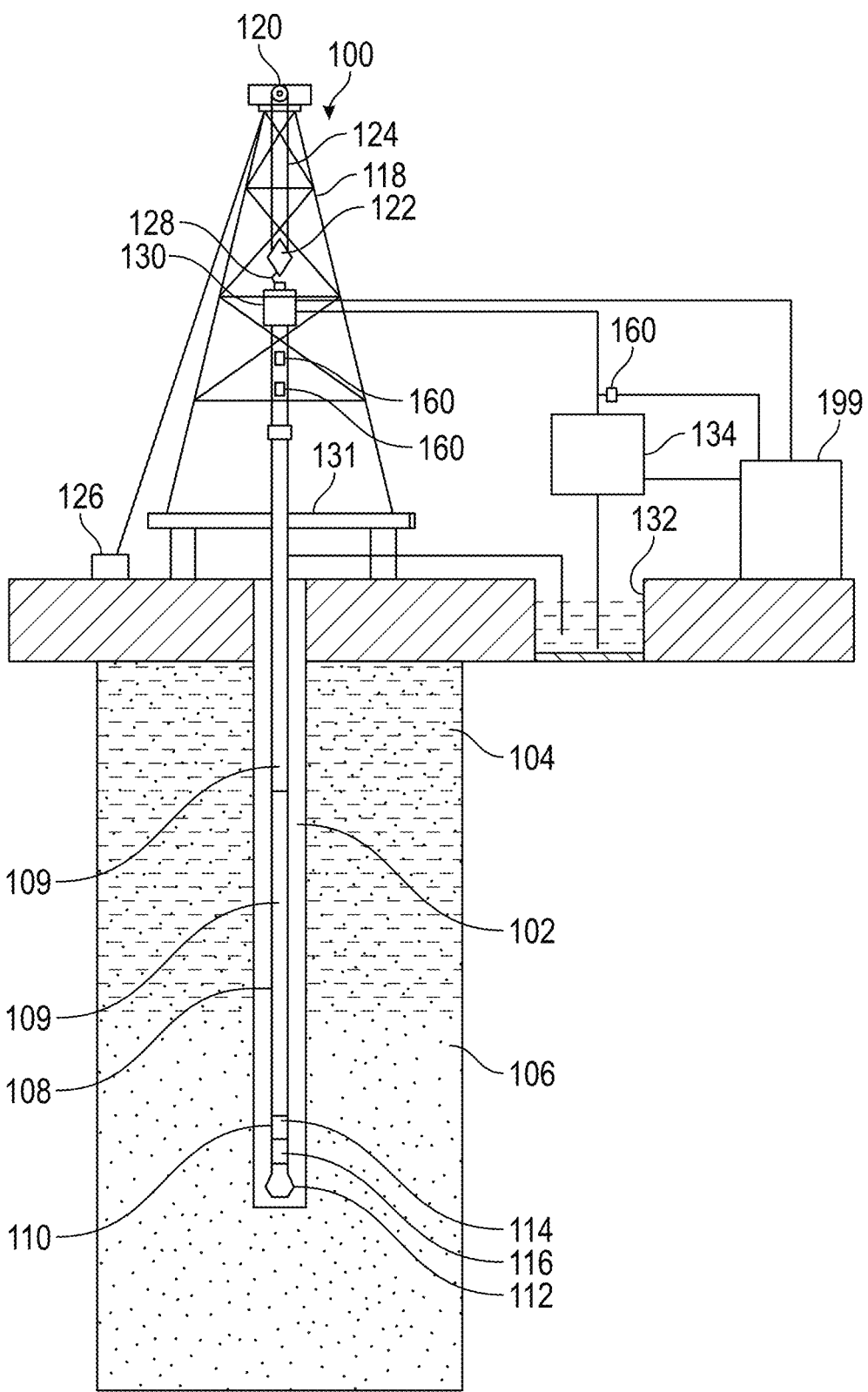
FIG. 1 depicts elements of a well environment in accordance with one or more embodiments.

FIG. 1 depicts a simplified well site (100). In general, well sites may be configured in a myriad of ways. Therefore, the illustrated well site (100) of FIG. 1 is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106). The wellbore (102) may include a bored hole that extends from the surface into a target zone of the subsurface formations (104, 106), such as a reservoir. The subsurface formations (104, 106) may be categorized by various formation properties of interest, such as formation porosity, formation permeability, resistivity, density, water saturation, total organic content and the like. Properties of the subsurface formations (104, 106) may vary spatially.

For the purpose of drilling a new section of wellbore (102), a drill string (108) is suspended within the wellbore (102). The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool (116). Measurement tools (114, 116) may include sensors and hardware to measure downhole drilling parameters, and these measurements may be transmitted to the surface using any suitable telemetry system known in the art. By means of example, a LWD tool (116) commonly collects information about the properties of the subsurface formations (104, 106). As previously described, these may include, but are not limited to, the density, the porosity, and the resistivity of the subsurface formations (104, 106). The BHA (110) and the drill string (108) may include other drilling tools known in the art but not specifically shown.

The drill string (108) may be suspended in a wellbore (102) by a derrick (118). A crown block (120) may be mounted at the top of the derrick (118), and a traveling block (122) may hang down from the crown block (120) by means of a cable or drilling line (124). One end of the cable (124) may be connected to a draw works (126), which is a reeling device that may be used to adjust the length of the cable (124) so that the traveling block (122) may move up or down the derrick (118). The traveling block (122) may include a hook (128) on which a top drive (130) is supported.

The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a system (199) may be disposed at or communicate with the well site (100). System (199) may control at least a portion of a drilling operation at the well site (100) by providing controls to various components of the drilling operation. In one or more embodiments, the system (199) may receive data from one or more sensors (160) arranged to measure controllable parameters of the drilling operation. As a nonlimiting example, sensors (160) may be arranged to measure WOB (weight on bit), RPM (drill string rotational speed), GPM (flow rate of the mud pumps), and ROP (rate of penetration of the drilling operation).

Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired quantity.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor (not shown). In other embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108).

The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the mud pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the system (199).

As noted, the well site (100) provides well logs either through measurement tools (114, 116) while drilling or by post-drilling surveys such as a wireline tool (not shown). Furthermore, data about the subsurface formations (104, 106) near a well site (100) may be obtained by analyzing the entrained cuttings, as a function to drilling depth, exiting the wellbore (102). In addition to data acquired at a well-site, other methods for collecting data and characterizing subsurface formations (104, 106) exist. For example, a seismic survey may be conducted.

For brevity, only a condensed description of a seismic survey is included herein, however, this brief description is non-limiting as one with ordinary skill in the art will appreciate that a seismic survey may be conducted in myriad of ways without departing from the scope of the present disclosure. For example, a seismic survey may be conducted with a variety of seismic sources, such as an airgun or vibroseis truck, and with a plurality of seismic receivers. Typically, the seismic source generates radiated seismic waves which may be reflected by geological discontinuities in the subsurface formations (104, 106) and may be returned to the surface and subsequently detected by the seismic receivers. In some cases, a single seismic source may be activated sequentially at various source locations. In other cases, multiple seismic sources positioned at different locations may be activated sequentially. Additionally, multiple seismic sources may be activated during the same time period, or during overlapping time periods. The waves are recorded by the seismic receivers as a time-series representing the amplitude of ground-motion at a sequence of discreet sample times. The time-series records constitute seismic data. Once acquired, seismic data may undergo a myriad of processing steps. The purposes of these processing steps include, but are not limited to, reducing signal noise, identifying subsurface structures and surfaces, and data visualization.

FIG. 2A demonstrates an example seismic image (200) formed from seismic data. As seen, the seismic image (200) depicts various layers representing surfaces which reflected seismic source waves at various depths (202) in a subsurface region of interest. The seismic image may be evaluated by a subject matter expert, a computer program, or both to further describe the subsurface region of interest. FIG. 2B shows that the seismic image (200) may be used, among other things, to identify one or more geological units (204) and various sequence boundaries (206).

Sets of data from a plurality of wells, which may include subsurface logs and/or petrophysical logs, and a seismic data may be collected and processed to provide lithology information over a subsurface region of interest. Data collected from previously drilled, nearby wells, sometimes called "offset" wells, may also be appended to the collected data. Moreover, so-called "soft" data, such as outcrop information and data describing analogous modern geological or depositional environments may be integrated with the acquired well site (100) data and seismic data to further refine the modeled subsurface formations (104, 106) over a subsurface region of interest. The modeled subsurface region of interest may include information about the spatial distribution of subsurface formation (104, 106) properties such as, but not limited to: porosity; mineral content; chemical makeup; and density. Additionally, the modeled subsurface region may include information about the subsurface formation (104, 106) geological unit (204) thicknesses. Regions of subsurface formations (104, 106) may be given qualitative lithology designations like "limestone", "wackestone", "siltysand", etc. based on the measured and modeled subsurface properties. Lithology designations are herein referred to as lithotypes. A more granular description of the subsurface formations (104, 106) may be defined using percentages of lithotypes. For example, a subsurface region and a stratigraphic region therein may be described as being 60% grainstone and 40% packstone.

Figure 3:
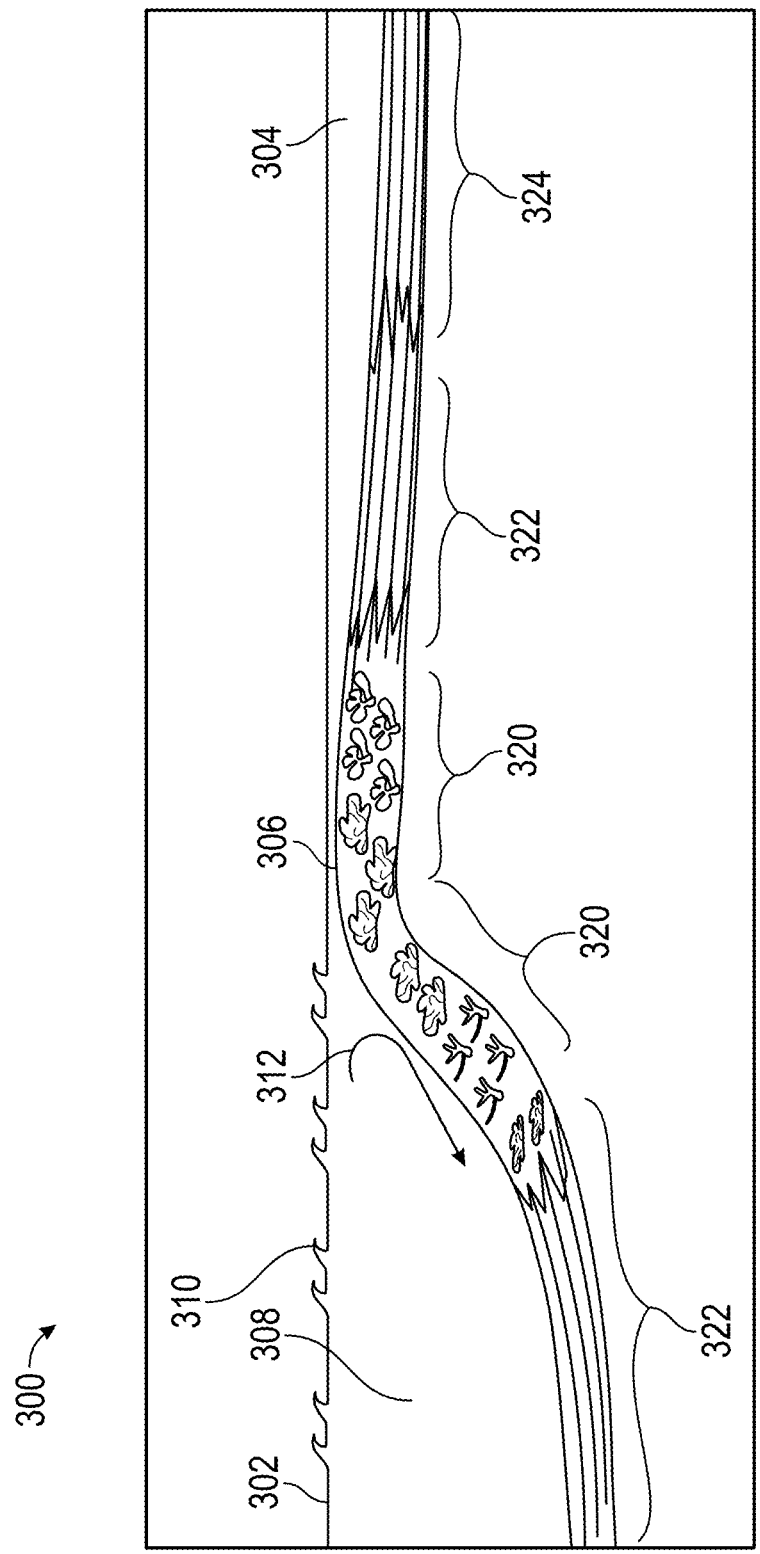
FIG. 3 depicts carbonate depositional environments in accordance with one or more embodiments.

The subsurface formations (104, 106) are produced and affected by geological processes. These geological processes include depositional processes such as sediment transport and syn-depositional and post-depositional processes such as diagenesis, including compaction and cementation. FIG. 3 demonstrates a variety of carbonate depositional environments and their correlation to the general lithology of the produced subsurface formations (104, 106).

Turning to FIG. 3, a didactic representation of carbonate depositional environments (300), representing, but not limited to carbonate platforms, carbonate ramps, and reef tracts, is shown. The environment includes a sea level (302) that may extend from a carbonate lagoon (304) over the carbonate platform margin, carbonate upper ramp/shoal, or reef crest (306) to a carbonate platform toe-of-slope, lower carbonate ramp, forereef and basin margin (308). The carbonate platform margin, carbonate upper ramp/shoal, or reef crest (306) may be composed of living and skeletal corals. The energy of ocean waves (310) and currents (312) on the carbonate platform slope, middle carbonate ramp or reef front (308) side of the carbonate platform margin, carbonate upper ramp reef/shoal, or reef crest (306) may be much greater than the waves and currents in either the shallow or deep portions of the carbonate lagoon (304). The bulk of the sedimentary deposits accumulating in such carbonate depositional environments (300) may be generated by the growth of corals on the reef (306) and the biological, chemical, or combined accretion of layers around various types of siliciclastic or carbonate particles (nuclei). The carbonate platform margin, carbonate upper ramp/shoal, or reef crest (306) is the location of the most robust coral growth. Coral growth and wave action along the carbonate platform margin, carbonate upper ramp reef and reef crest (306) and proximate zones, commonly result in carbonate lithotypes such as boundstone, framestone, bafflestone, rudstone, floatstone, grainstone and packstone (320). These stones (320), for example boundstone, may be composed of constituents that are too large to be transported even by energetic ocean waves (310) and ocean currents (312). Successive generations of coral may bury and grow on top of these stones (320), particularly during geological periods of sea-level rise or regional tectonic subsidence. In the shallow portion of the lagoon (304), where the energy of waves and currents are lower, smaller carbonate grains may be transported and deposited to form carbonate lithotypes such as packstone and floatstone (322). At greater distances from the carbonate platform margin, carbonate upper ramp/shoal, and reef crest (306) into the deeper portions of the carbonate lagoon (304) still smaller and more easily transported grains as well as carbonate mud may be deposited to form carbonate lithotypes of wackestone and mudstone (324). On the carbonate platform slope, middle carbonate ramp, or reef front (308) side of the carbonate platform margin, carbonate upper ramp/shoal, and reef crest (306), the high energy ocean waves (310) and ocean currents (312) may carry sand grains further from carbonate platform margin, carbonate upper ramp/shoal, and reef crest over a broader zone stretching from the carbonate platform margin, carbonate upper ramp/shoal, and reef crest (306) into the deeper ocean resulting in the carbonate lithotypes of grainstone or rudstone (322).

Furthermore, the classification of carbonate rocks may be done with a classification system such as the Dunham and Embry and Klovan classification systems. These classification systems categorize a carbonate rock based on characteristics such as texture, amount of particles and carbonate mud present, and size of constituents. The Dunham classification system, relating carbonate rock characteristics to a carbonate lithotype, is summarized in Table 1.

| Carbonate Lithotypes | Characteristics |
| --- | --- |
| Mudstone | Constituents not organically bound during deposition<br>Less than 10% > 2 mm components<br>Contains carbonate mud <0.03 mm<br>Mud-supported<br>Less than 10% grains >0.03 mm and <2 mm |
| Wackestone | Constituents not organically bound during deposition<br>Contains carbonate mud <0.03 mm<br>Mud-supported<br>Greater than 10% grains<br>Less than 10% > 2 mm components |
| Floatstone | Constituents not organically bound during deposition<br>Greater than 10% > 2 mm components<br>Matrix-supported |
| Packstone | Constituents not organically bound during deposition<br>Contains carbonate mud <0.03 mm<br>Less than 10% > 2 mm components<br>Grain-supported |
| Grainstone | Constituents not organically bound during deposition<br>No carbonate mud<br>Grain-supported |
| Rudstone | Constituents not organically bound during deposition<br>Greater than 10% > 2 mm components<br>>2 mm component-supported |
| Boundstone | Constituents organically bound during deposition by organism(s) which build a rigid framework, or encrust and bind, or act as bafflers (summary term) |
| Framestone | Constituents bound organically bound during deposition by organism(s) which build a rigid framework |
| Bindstone | Constituents organically bound during deposition by organism(s) which encrust and bind |
| Bafflestone | Constituents organically bound during deposition by organism(s) which act as bafflers |

The various lithotypes of the subsurface formations (104, 106) often reflect the conditions under which they were formed. That is different geological processes and environments produce different lithotypes.

Figure 4:
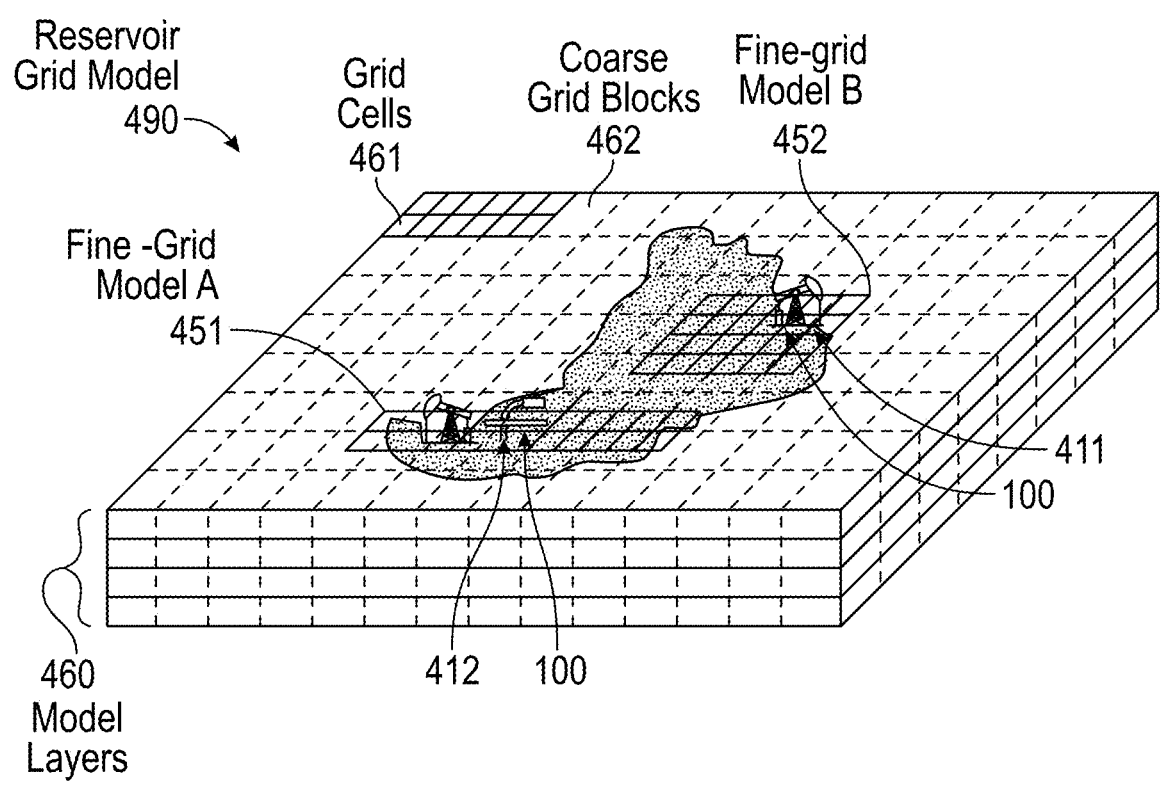
FIG. 4 depicts a grid model of a reservoir simulator in accordance with one or more embodiments.

Now turning to FIG. 4, FIG. 4 shows the basis of a reservoir simulator in accordance with one or more embodiments. FIG. 4 shows a reservoir grid model (490) that corresponds to a geological region. The geological region may span multiple well sites (100) and a subsurface region of interest. The well sites (100) may include injection wells (412), which inject a fluid into the local subsurface formations (104, 106), or an extraction well (411). More specifically, the reservoir grid model (490) includes grid cells (461) that may refer to an original cell of a reservoir grid model as well as coarse grid blocks (462) that may refer to an amalgamation of original cells of the reservoir grid model. For example, a grid cell may be the case of a 1×1 block, where coarse grid blocks may be of sizes 2×2, 4×4, 8×8, etc. Both the grid cells (461) and the coarse grid blocks (462) may correspond to columns for multiple model layers (460) within the reservoir grid model (490).

Prior to performing a reservoir simulation, local grid refinement and coarsening (LGR) may be used to increase or decrease grid resolution in a certain area of reservoir grid model (490). For example, various reservoir properties, e.g., permeability, porosity or saturations, may correspond to a discrete value that is associated with a particular grid cell or coarse grid block. However, by using discrete values to represent a portion of a geological region, a discretization error may occur in a reservoir simulation. Thus, finer grids may reduce discretization errors as the numerical approximation of a finer grid is closer to the exact solution, however through a higher computational cost. As shown in FIG. 4, for example, the reservoir grid model (490) may include various fine-grid models (i.e., fine-grid model A (451), fine-grid model B (452)), that are surrounded by coarse block regions. Likewise, the original reservoir grid model (490) without any coarsening may also be a fine-grid model. In some embodiments, a reservoir grid model (or multiple reservoir grid models) may be used to preform reservoir simulations.

In some embodiments, a reservoir simulator comprises functionality for simulating the flow of fluids, including hydrocarbon fluids such as oil and gas, through a hydrocarbon reservoir composed of porous, permeable reservoir rocks in response to natural and anthropogenic pressure gradients. The reservoir simulator may be used to predict changes in fluid flow, including fluid flow into well penetrating the reservoir as a result of planned well drilling, and fluid injection and extraction. For example, the reservoir simulator may be used to predict changes in hydrocarbon production rate that would result from the injection of water into the reservoir from wells around the reservoirs periphery.

The reservoir simulator may use a subsurface model that contains a digital description of the physical properties of the rocks as a function of position within the subsurface region of interest and the fluids within the pores of the porous, permeable reservoir rocks at a given time. In some embodiments, the digital description may be in the form of a dense 3D grid with the physical properties of the rocks and fluids defined at each node. In some embodiments, the 3D grid may be a cartesian grid, while in other embodiments the grid may be an irregular grid.

The physical properties of the rocks and fluids within the reservoir may be obtained from a variety of geological and geophysical sources. For example, remote sensing geophysical surveys, such as seismic surveys, gravity surveys, and active and passive source resistivity surveys, may be employed. In addition, data collected such as well logs, production data as previously discussed, acquired in wells penetrating the reservoir may be used to determine physical and petrophysical properties along the segment of the well trajectory traversing the reservoir. For example, porosity, permeability, density, seismic velocity, and resistivity may be measured along these segments of wellbore. In accordance with some embodiments, remote sensing geophysical surveys and physical and petrophysical properties determined from well logs may be combined to estimate physical and petrophysical properties for the entire reservoir simulation model grid.

Reservoir simulators solve a set of mathematical governing equations that represent the physical laws that govern fluid flow in porous, permeable media. For example, the flow of a single-phase slightly compressible oil with a constant viscosity and compressibility the equations capture Darcy's law, the continuity condition and the equation of state and may be written as:

$$\nabla^2 p(x,t) = \frac{\varphi \mu c_t}{k} \frac{\partial p(x,t)}{\partial t},$$

where p represents fluid in the reservoir, x is a vector representing spatial position and t represents time. $\varphi$, $\mu$, $c_t$, and k represent the physical and petrophysical properties of porosity, fluid viscosity, total combined rock and fluid compressibility, and permeability, respectively. $\nabla^2$ represents the spatial Laplace operator.

Additional, and more complicated equations are required when more than one fluid, or more than one phase, e.g., liquid and gas, are present in the reservoir. Further, when the physical and petrophysical properties of the rocks and fluids vary as a function of position the governing equations may not be solved analytically and must instead be discretized into a grid of cells or blocks. The governing equations must then be solved by one of a variety of numerical methods, such as, without limitation, explicit or implicit finite-difference methods, explicit or implicit finite element methods, or discrete Galerkin methods.

As stated, a reservoir simulator may account for, among other things, the porosity and hydrocarbon storage capacity of the subsurface formations (104, 106) and fluid transport pathways to predict the production rate of hydrocarbons of a well, or a set of wells, over their lifetime. As such, accurate subsurface models are critical to reduce exploration risks, plan the location of well sites (100), optimize reservoir production, improve reservoir characterization, best leverage existing discoveries, and better extend hydrocarbon recovery from existing wells. One type of subsurface model is a depositional model.

Depositional models, broadly defined, are process-based models which seek to reproduce the geological time evolution of a geographic region. Depositional models are powerful because depositional sequences directly correlate to subsurface formation (104, 106) properties. Additionally, depositional processes affect reservoir architecture, govern fluid flow, and may define stratigraphic compartments. Depositional models include the capability to create gross depositional environment (GDE) maps which represent the depositional environment, like shown in FIG. 3, that when coupled with other geological processes, produces the subsurface region of interest. Typically, GDE maps are created using data from a plurality of subsurface logs (e.g., well logs, petrophysical logs) processed to provide lithology information over a subsurface region of interest. Additionally, data acquired from a seismic survey, or data collected from offset wells or outcrops may be incorporated in the creation of a GDE map.

Another, often related, subsurface modeling method is the three-dimensional (3D) digital reconstruction of the paleo bathymetry associated with a depositional environment. A full description of the process for developing a 3D digital paleo-bathymetric map is not provided here for brevity. However, the general process begins with modeling seismic surfaces using estimated thickness data of geological units, and other geophysical data, acquired from a seismic survey. Once the seismic surfaces have been modeled, they are further processed by a decompaction model to transform the thicknesses of the geological units (204) to decompacted thicknesses. The decompacted thickness model is subsequently combined with a relief map, which is derived from a GDE map, to create a relative bathymetry. The bathymetry is converted to the final 3D digital paleo-bathymetric surface by a bulk shift translation.

One with ordinary skill in the art will appreciate that many modifications and processing techniques may be applied to the modeling and/or construction of both GDE maps and 3D paleo-bathymetric reconstructions. As such, the previously provided general descriptions do not impose a limitation on the present disclosure.

Returning to gross depositional environment (GDE) maps, an important component, which may be integrated into GDE maps, is the modeling of sediment trajectories. Sediment trajectories include the transportation mechanisms and pathways of sediment. For siliciclastic rocks, where sediment is typically transported from a source located in a continental high to a basin located in a continental low such as a marine realm, the sediment transport is generally governed by the energy of the transportation medium and the grain size of the sediment. However, for carbonate sedimentary systems, where sediment primarily develops in-situ by chemical, biological, or combined precipitation, as shown in FIG. 3, sediment trajectories are not well-understood. Consequently, carbonate sedimentary trajectories are not currently incorporated into GDE maps.

In one aspect, embodiments disclosed herein relate to the inclusion of carbonate sedimentary trajectories in a Gross Depositional Environment (GDE) map. Such an inclusion represents an enhanced GDE map. The enhanced GDE map, which better describes carbonate sediment systems, reduces uncertainty within the subsurface model, thereby improving reservoir characterization and reservoir quality prediction. Additionally, the enhanced GDE map serves to mitigate exploration risk, improves reservoir simulation models and projections of hydrocarbon production rates, and benefits and informs well-planning activities.

Figure 5:
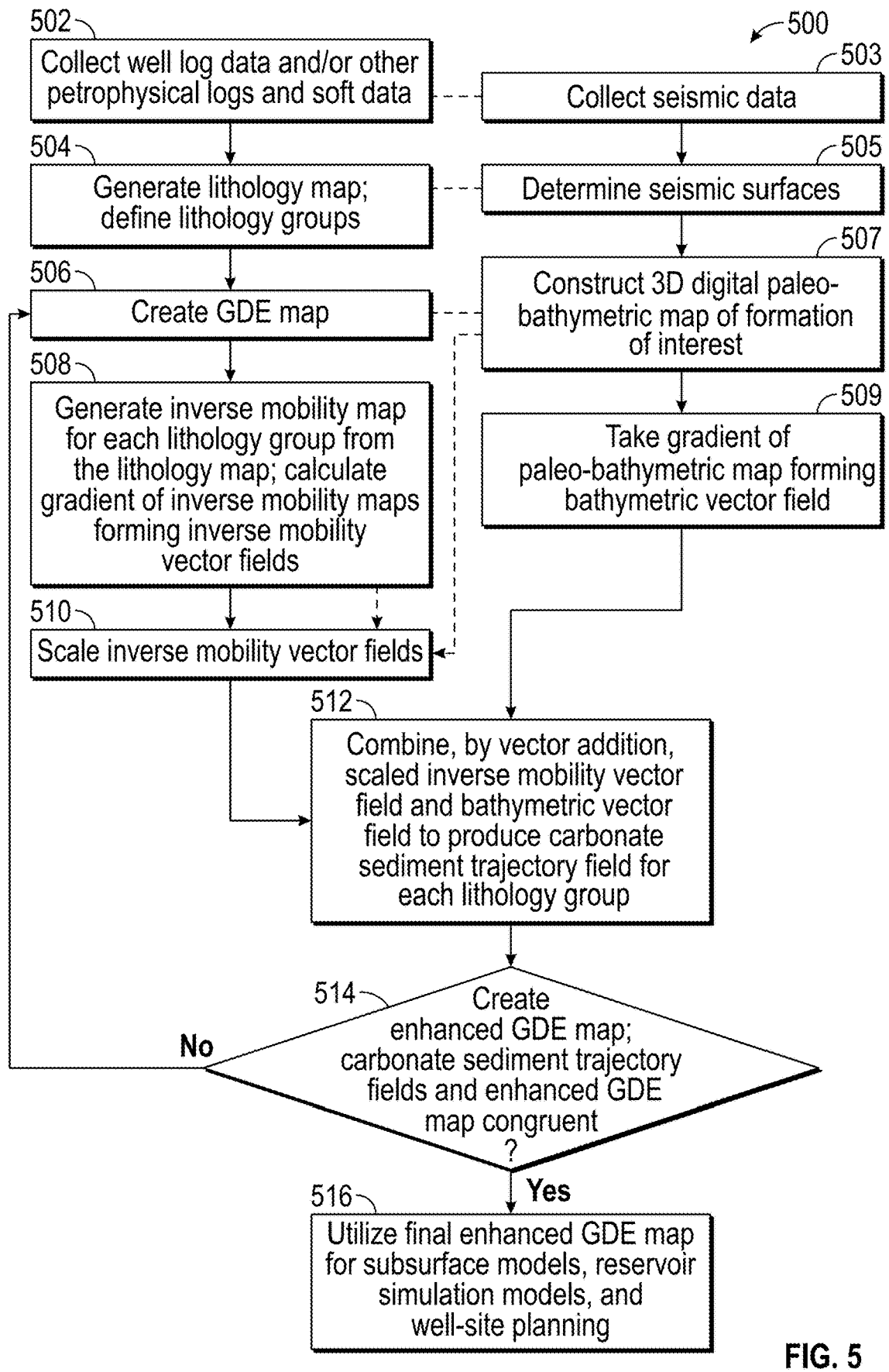
FIG. 5 shows a flowchart in accordance with one or more embodiments.

In accordance with one or more embodiments, FIG. 5 depicts a flowchart illustrating a process for forming enhanced GDE maps (500). Greater detail regarding specific procedures identified in FIG. 5 will be provided as needed. As previously described, to form a GDE map, various data types from various sources must be collected. As shown in Block 502, the data may be collected from a plurality of wells, including offset wells, in the form of well logs. The data may also include other petrophysical logs, "soft" data such as information from outcrop-reservoir analogue descriptions, or any other data as previously described. The data are processed, using any method known in the art, to generate a lithology map of the subsurface region of interest according to Block 504. The lithology map serves to categorize the subsurface formations (104, 106), or spatial points of the subsurface formations (104, 106), to lithotypes. For example, carbonate lithotypes may include boundstone, grainstone, packstone, wackestone, and mudstone. The lithology map is resolved such that the subsurface region of interest and the contained subsurface formations (104, 106) may be described spatially by the constituent lithotypes, where the relative local abundance of the lithotypes are given by a percentage. For a 3D volume, the percentage may be given by volume and for 2D models, the percentage may be given by a surface area.

By way of example, the lithology map is constructed such that a spatial point may be shown to be composed of 40% boundstone, 50% grainstone, and 10% wackestone. Additionally, as shown in Block 504, lithology groups are defined. A lithology group (lithology association) is a set of one or more lithotypes. Herein, a set is distinguished by enclosing the elements of the set within curled parentheses, { }. Elements in a set are unordered. In accordance with one or more embodiments, four lithology groups are defined: {boundstone}, {grainstone, packstone}, {mudstone, wackestone}, {boundstone, grainstone, packstone, mudstone, wackestone}. Those skilled in the art will appreciate that there may be additional or alternate lithology groups defined without departing from the scope disclosed herein.

In Block 503, seismic data may also be collected, likely through a seismic survey as previously outlined. The collection of seismic data may be done before, concurrently, or after the collection of the data of Block 502. Additionally, the data of Block 502 and Block 503 may be combined, considered a single dataset, or used harmoniously to inform and refine the subsequently produced models, as demonstrated by the dashed line connecting Blocks 502 and 503.

Using the seismic data of Block 503, the data are processed to determine seismic surfaces as stated in Block 505. Again, any method, process, or procedure known in the art to determine the seismic surfaces, such as the determination and interpretation of a seismic image (200), may be used without restricting the scope of the present disclosure. As before, seismic surface information may be used congruently with the lithology map of Block 504, demonstrated by the dashed line between Blocks 504 and 505. That is, the lithology map may inform or refine the seismic surface model and vice versa.

Continuing to Block 506, Gross Depositional Environment (GDE) maps, which represent the depositional environment wherein the sediments are formed and transported, are created using any procedure known in the art. As stated in paragraph [0046], GDE maps are generally formed using descriptions of lithology, such as the lithology map of Block 504. As such, it may be stated that a GDE map comprises a lithology map. Likewise, a 3D digital paleo-bathymetric map of the formation of interest is constructed from the seismic surfaces, as shown in Block 507, according to the general process previously described in paragraph [0047]. Again, a dashed line between Blocks 507 and 506 indicates that the generated GDE maps and 3D digital paleo-bathymetric maps may be used in a complementary fashion.

Figure 6:
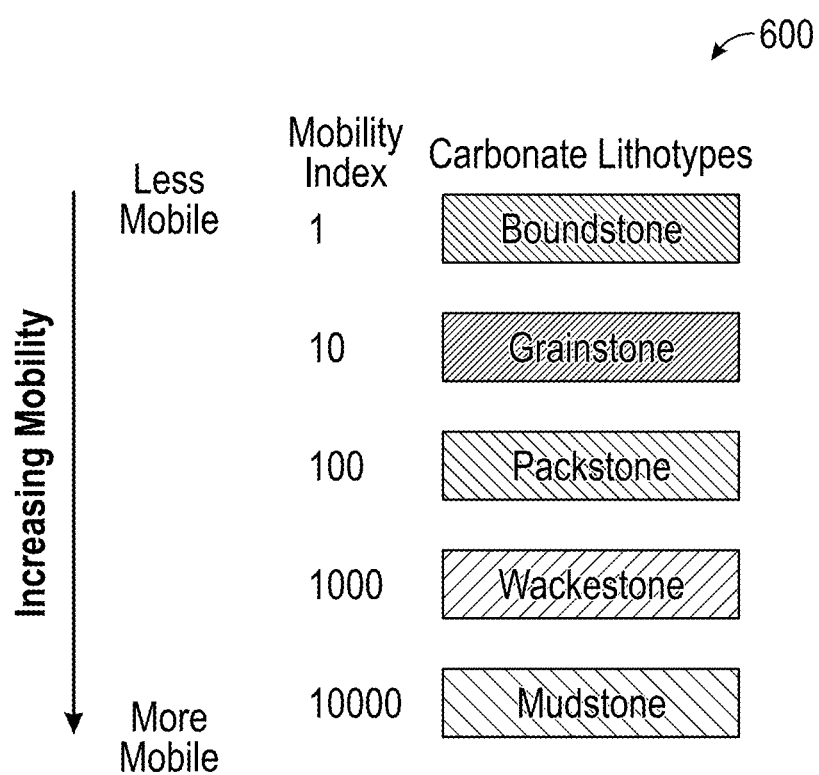
FIG. 6 illustrates an assigned mobility index according to carbonate rock type in accordance with one or more embodiments.

In order to determine carbonate sediment trajectories, a concept of carbonate mobility is defined. In a brief departure from the flow chart of FIG. 5, FIG. 6 demonstrates the assignment of a mobility index to some carbonate lithotypes which may be present in a subsurface region of interest. Here, "mobility" generally refers to a carbonate lithotype's proclivity to movement in both terms of likelihood and frequency. A higher mobility suggests that less energy, with respect to the transportation medium, is needed to move the carbonate lithotype. As depicted in FIG. 6, boundstone is assigned the lowest mobility index with a value of 1. In contrast, mudstone is assigned the highest mobility index with a value of 10,000. The assigned values are arbitrary and may be altered in other embodiments. It is noted that the mobility index is not associated with grain size, as may be the case for siliciclastic rocks.

With a mobility index assigned to each carbonate lithotype, the lithology map may be converted to an inverse mobility map. Recall, the lithology map contains information about the spatial distributions of lithotypes. Specifically, each lithology map, in the case where there is more than one, is converted to an inverse mobility map for each lithology group. The conversion of a lithology map to an inverse mobility map for each lithology group is done through the following general equation:

$$IMV_{lithology\ group} = log_{10}\left(\sum_{i\ \in\ \{lithology\ group\}} \frac{percent(i)}{mobility\ index(i)}\right) \quad (1)$$

In EQ. 1, IMV is the inverse mobility value. As shown, to compute an inverse mobility value for a lithology group a summation is taken over each carbonate lithotype in the lithology group. For each carbonate lithotype, the percent contribution of that carbonate lithotype to a spatial point in the lithology map is divided by the mobility index defined for that carbonate lithotype. It is emphasized that EQ. 1 is taken pointwise such that every spatial point in a lithology map may be converted to an inverse mobility value, in the same spatial location, creating an inverse mobility map. An inverse mobility map is created for each lithology group. As a concrete example, consider a spatial point on a lithology map which is composed of 40% boundstone, 40% grainstone, and 20% packstone. Using the lithology group {grainstone, packstone} and the mobility indices defined in FIG. 6, this spatial point would be converted to an inverse mobility value as follows:

$$IMV_{\{grainstone, packstone\}} = log_{10}\left(\frac{40}{10} + \frac{20}{100}\right) = log_{10}(4.2) = 0.623.$$

Returning to the flowchart of FIG. 5, the generation of inverse mobility maps for each lithology group using the lithology map, mobility indices (FIG. 6), and EQ. 1 is illustrated in Block 508. Additionally, as stated in block 508, the gradient of the inverse mobility maps is calculated. An inverse mobility map is composed of scalar spatial point data such that its gradient is a vector field. The resulting vector fields are hereafter referred to as inverse mobility vector fields. The inverse mobility vector fields, or the inverse mobility vector maps from which they are determined may undergo processing such as smoothing and de-noising. In accordance with one or more embodiments, the inverse mobility vector fields only partially contribute to the carbonate sediment trajectory. The remaining contribution and how it is combined with the inverse mobility vector fields is described below.

As shown in Block 507, a 3D digital paleo-bathymetric map of the formation of interest is constructed. Like the lithology map, the 3D digital paleo-bathymetric map is composed of scalar spatial data. As such, the gradient of the 3D digital paleo-bathymetric map is a vector field described herein as a bathymetric vector field. In Block 509, the gradient of the 3D digital paleo-bathymetric map is employed to form a bathymetric vector field. Again, the bathymetric vector field, or the 3D digital paleo-bathymetric map from which this vector field is determined, may undergo pre-processing such as smoothing and de-noising.

Before combining the bathymetric vector field and inverse mobility vector fields to produce a carbonate sediment trajectory field, the inverse mobility vector fields are scaled. To scale the inverse mobility vector fields, a scaling parameter (SP) is determined for each lithology group. The scaling parameter (SP) is calculated using the inverse mobility map, for each lithology group, and the 3D digital paleo-bathymetric map as $$SP_{lithology\ group} = \frac{(max\ (water\ depth) - min\ (water\ depth))}{max\ (IMV_{lithology\ group}) - min\ (IMV_{lithology\ group})}, \quad (2)$$

where water depth refers to the scalar values of the 3D digital paleo-bathymetric map.

In Block 510, scaling of the inverse mobility vector fields is performed. To emphasize that the scaling uses both the inverse mobility maps and the 3D digital paleo-bathymetric map, a dashed arrow extends from both Blocks 507 and 508 to Block 510. The scaled inverse mobility vector fields and bathymetric vector field are combined, for each lithology group, by vector addition to form carbonate sediment trajectories. That is, carbonate sediment trajectories, a vector field, is formed for each lithology group as shown in Block 512. For clarity, the carbonate sediment trajectory fields are calculated as follows:

$$\text{carbonate sediment trajectory field}_{lithology\ group} = \\ SP_{lithology\ group} * \text{inverse mobility vector field}_{lithology\ group} + \text{bathymetric vector field} \quad (3).$$

It is emphasized that the inverse mobility vector field and bathymetric vector field, when added, correspond to the same spatial region. Additionally, it is noted that the traditional definition of a gradient of a scalar map is such that the resulting vectors point from directions of low scalar values to relatively higher scalar values. As such, the vectors from the gradient of an inverse mobility map are directed from points of high mobility (low inverse mobility) to low mobility (high inverse mobility). Likewise, bathymetric vectors generally point from low water depths to higher water depths on the paleo-bathymetric map. In accordance with one or more embodiments, negation of the inverse mobility vector fields and/or bathymetric vector field may be required to properly orient the carbonate sediment trajectory fields.

The carbonate sediment trajectory fields are incorporated into the gross depositional environment (GDE) maps to create an enhanced GDE map (Block 514). By including carbonate sediment trajectories, the enhanced GDE map better describes the environment of the carbonate sediment system and reduces uncertainty in the characterization of the subsurface model. However, the carbonate sediment trajectories were calculated using, in part, the original GDE maps. As such, the enhanced GDE map may be used to determine new carbonate sediment trajectories and further refine, by way of an update, the enhanced GDE map. Consequently, Block 514 also represents a decision where the GDE map, including the enhanced GDE map and the carbonate sediment trajectory fields, are iteratively updated until they demonstrate congruency.

In Block 516, once the enhanced GDE map and carbonate sediment trajectory fields are congruent, the enhanced GDE map is marked or labelled as the final enhanced GDE map. In accordance with one or more embodiments, the final GDE map may be used alongside other collected data such as well logs, petrophysical logs, and seismic data to model the subsurface region of interest (i.e., form a subsurface model), inform a reservoir simulator, and plan a well-site and wellbore trajectory. The incorporation of carbonate sediment trajectories in the GDE map results in improved accuracy in the GDE map which, in turn, provides better estimates of reservoir quality, enhances characterization and visualization of the subsurface region of interest, improves reservoir simulation models and projections of hydrocarbon production, and aids in the planning of well sites (100).

While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Figure 7:
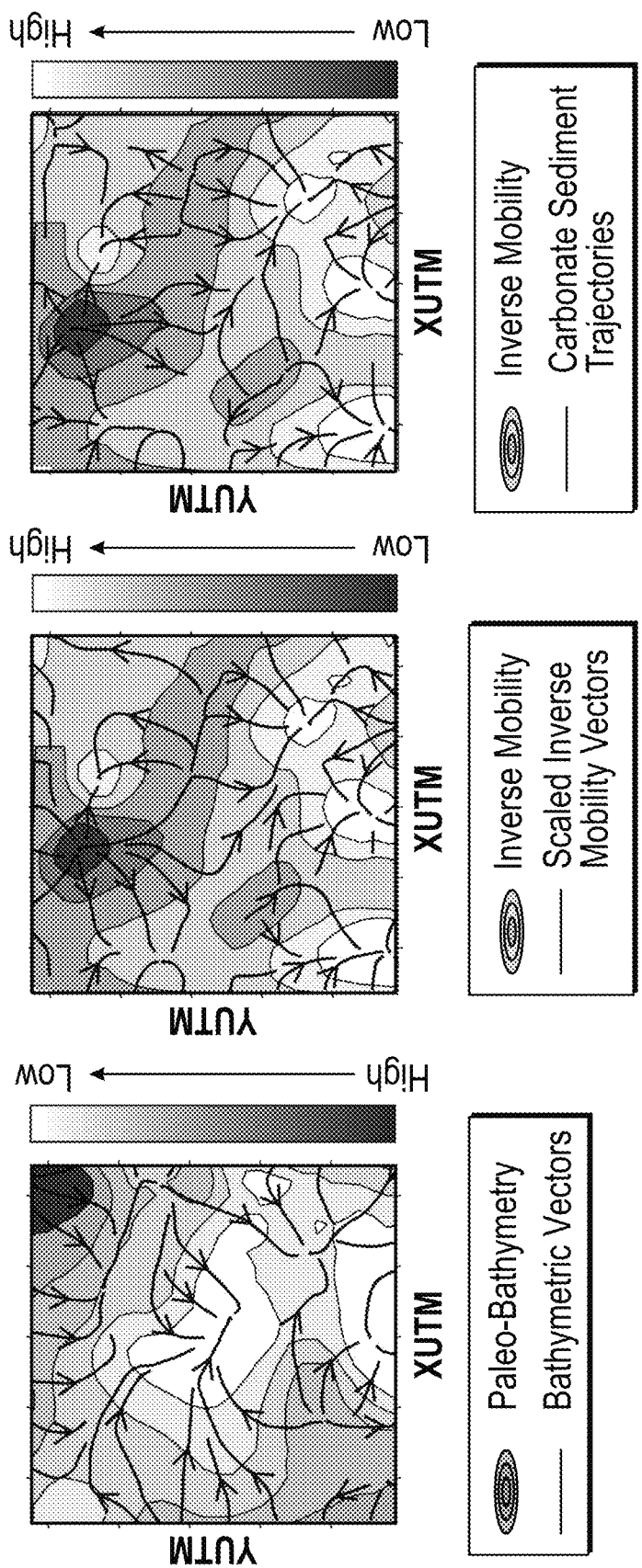
FIG. 7A shows a paleo-bathymetric map and bathymetric vectors in accordance with one or more embodiments.
FIG. 7B shows an inverse mobility map and scaled inverse mobility vectors in accordance with one or more embodiments.
FIG. 7C shows an inverse mobility map and carbonate sediment trajectories in accordance with one or more embodiments.

FIGS. 7A-7C depict an example 3D digital paleo-bathymetric map with a bathymetric vector field, an inverse mobility map with a scaled inverse mobility vector field, and the inverse mobility map with the resulting carbonate sediment trajectory field after the vector addition of the bathymetric vector field and the scaled inverse mobility vector field, respectively. Specifically, FIG. 7A shows a "top-down" view, or contour plot view, of a 3D digital paleo-bathymetric map. The map of FIG. 7A corresponds with block 507 of FIG. 5 and is produced, by any method known in the art, using, at least, the seismic surfaces of block 505. However, as previously described, additional data such as subsurface logs may be included in the construction of the 3D digital paleo-bathymetric map. The bathymetric vector field, which is a result of taking the gradient of the paleo-bathymetric map, is super-imposed on FIG. 7A. Taking the gradient to form the bathymetric vector field is encompassed by Block 509 of FIG. 5. Again, the bathymetric vector field, or the paleo-bathymetric map, may undergo additional processing such as smoothing and de-noising.

FIG. 7B shows the inverse mobility map of an arbitrary lithology group, as previously described, according to Block 508 of FIG. 5. The inverse mobility map may be generated by parsing a lithology map (block 504) with EQ. 1 according to a lithology group. The scaled inverse mobility vector field, which is a result of taking the gradient of the inverse mobility map, and scaling the gradients using equations 2 and 3, is super-imposed on FIG. 7B. The inverse mobility map, or the gradient of the inverse mobility map, may undergo additional processing such as smoothing and de-noising. Taking the gradient of the inverse mobility map and scaling the inverse mobility vector field is encompassed by Blocks 508 and 510, respectively, in FIG. 5. It is emphasized that throughout this process, the maps of FIGS. 7A and 7B correspond to the same region such that they are spatially aligned.

The bathymetric vector field of FIG. 7A and the scaled inverse mobility vector field of FIG. 7B are combined, by vector addition, to produce a carbonate sediment trajectory field; again, for an arbitrary lithology group. This step is outlined in Block 512 of FIG. 5. The resulting carbonate sediment trajectory field is super-imposed on the inverse mobility map in FIG. 7C. The carbonate sediment trajectory field may be used to inform the GDE maps generating an enhanced GDE map and subsequent refinement of the carbonate sediment trajectories.

Figure 8:
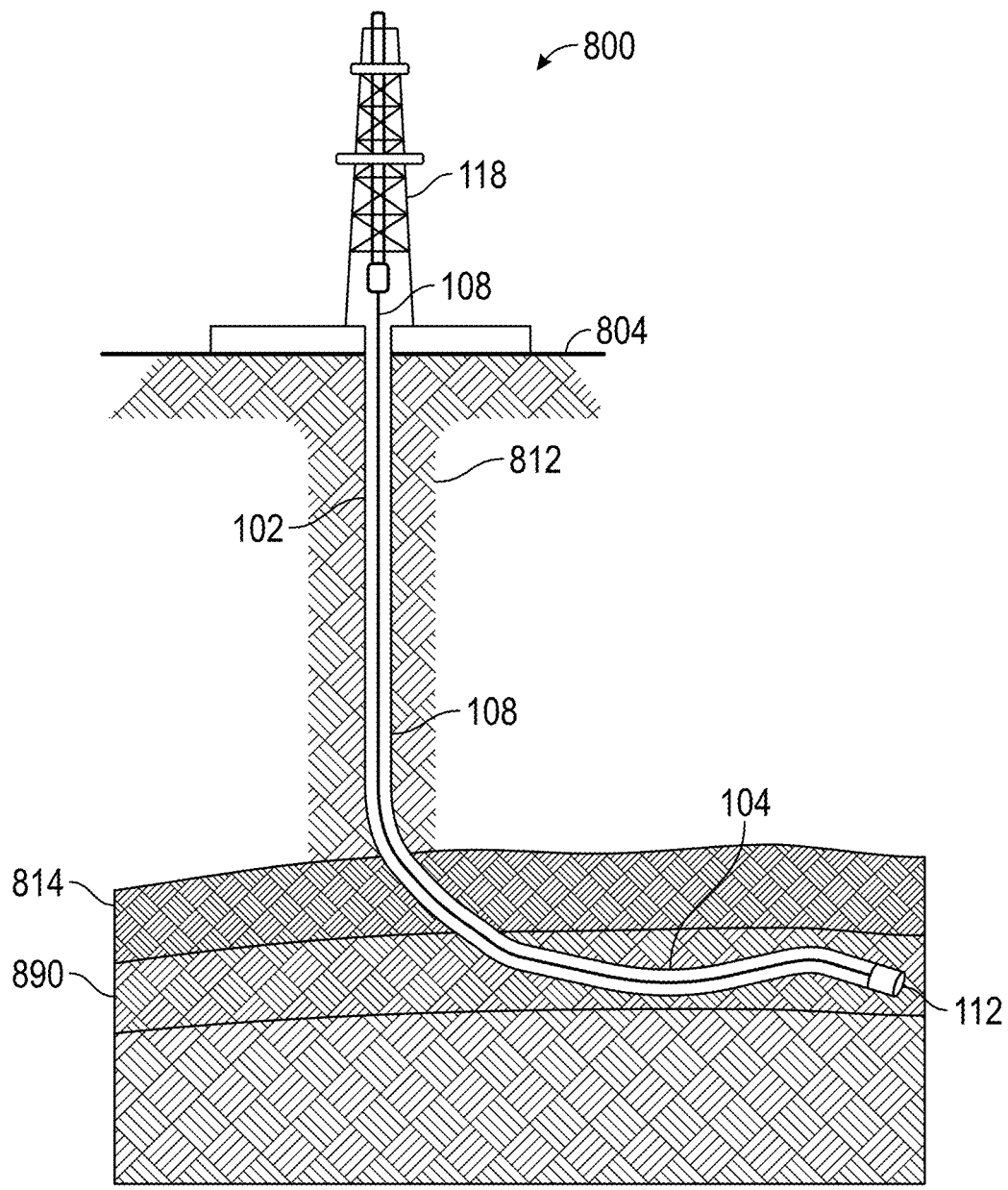
FIG. 8 depicts a drilling system in accordance with one or more embodiments.

In accordance with one or more embodiments, the final enhanced GDE map, accompanying improved subsurface models, and reservoir simulator may be used to plan a drilling target. For example, FIG. 8 shows a drilling system (800) in accordance with one or more embodiments. The drilling system (800) may include a derrick (118). In some embodiments, the derrick (118) may be located on the land surface (804). In other embodiments, the derrick may be located on a jack-up drill rig (not shown), or a floating drill rig (not shown), or on a drill ship (not shown). A drill bit (112) suspended by a drill string (108) from the derrick (118) may drill a wellbore (102) through the subsurface. In accordance with one or more embodiments, the wellbore may be vertical, highly deviated, or horizontal. The wellbore (102) may traverse a plurality of overburden layers (812) and one or more cap-rock layers (814). The wellbore (102) may penetrate one or more hydrocarbon reservoirs (890) at the location of one or more drilling targets. The wellbore path may be planned and drilled on a targeted hydrocarbon reservoir (890) based, at least in part, on a subsurface model of the subsurface region of interest and/or a reservoir simulation, each informed by an enhanced GDE map. For example, the well-site location, and wellbore path, may be planned based on the projected hydrocarbon production from the subsurface region of interest with an improved reservoir simulation model constructed with an enhanced GDE map.

In some embodiments, the drilling system (800), measurement tools (114, 116), and/or the various process of the present disclosure outlined in the flowchart of FIG. 5 may include a computer system that is similar to the computer system (902) described below with regard to FIG. 9 and the accompanying description.

Figure 9:
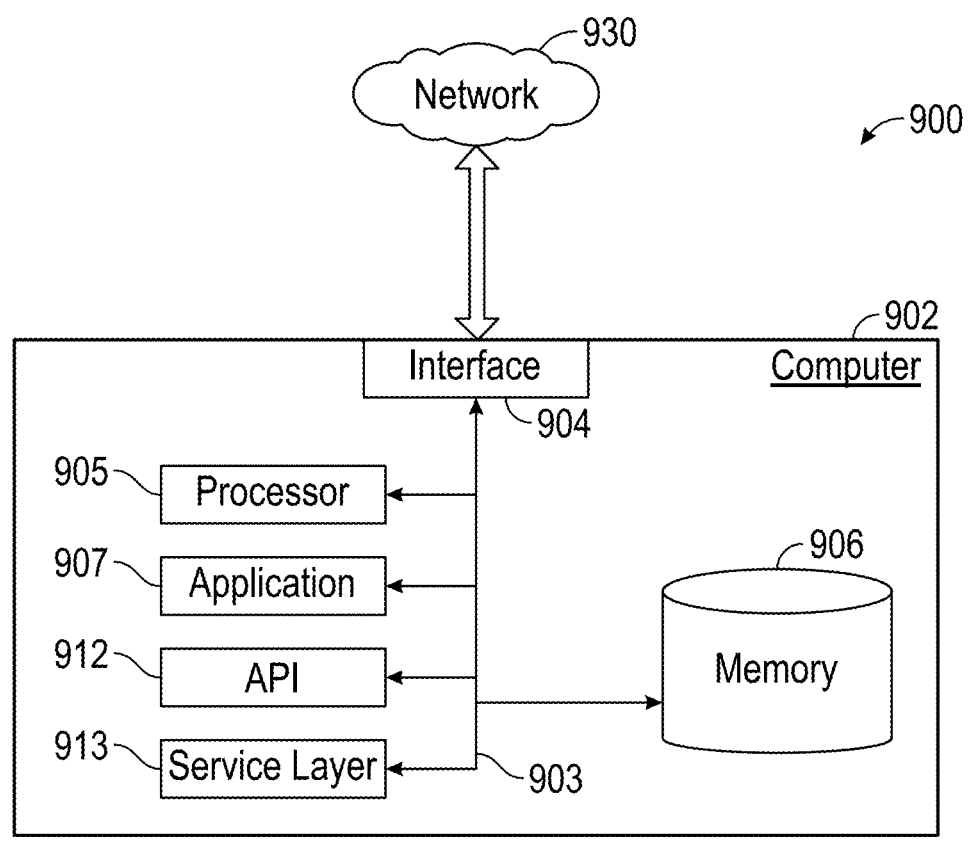
FIG. 9 depicts a system in accordance with one or more embodiments.

FIG. 9 shows a system in accordance with one or more embodiments. FIG. 9 depicts a block diagram of the computer system (902) used to provide computational functionalities associated with described algorithms, methods, functions, processes, flows, and procedures as described in this disclosure, according to one or more embodiments. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a Graphical User Interface (GUI).

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components, such as computer executable instructions, (or a combination of both) that can be connected to the network (930). The memory (906) may be non-transitory computer readable memory. For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

What is claimed is:

1. A method of enhancing a gross depositional environment (GDE) map of a subsurface formation, comprising:
   obtaining the GDE map of the subsurface formation, wherein the GDE map comprises a lithology map of a plurality of lithotypes;
   obtaining a paleo-bathymetric map of the subsurface formation;
   assigning an inverse mobility for each of the lithotypes;
   forming a bathymetric vector field based, at least in part, on a gradient of the paleo-bathymetric map;
   defining at least one lithology group from the plurality of lithotypes;
   for each lithology group:
      generating an inverse mobility map from the lithology map and the assigned inverse mobilities,
      forming an inverse mobility vector field based, at least in part, on the gradient of the inverse mobility map, and
      scaling the inverse mobility vector field based, at least in part, on the paleo-bathymetric map and the inverse mobility map;
   combining, by vector addition, the scaled inverse mobility vector field for each lithology group and the bathymetric vector field to produce a carbonate sediment trajectory field for each lithology group; and
   determining an enhanced gross depositional environment map based, at least in part, on the carbonate sediment trajectory field of at least one lithology group,
   determining a subsurface model based, at least in part, on the enhanced gross depositional map;
   planning a location of a well-site and a planned wellbore trajectory based, at least in part, on the subsurface model; and
   drilling a wellbore guided by the planned wellbore trajectory using a drilling system.

2. The method of claim 1, further comprising:
   determining a reservoir simulation model based, at least in part, on the enhanced GDE map; and
   simulating a production rate of hydrocarbons from the subsurface formation using a reservoir simulator, based at least in part on the reservoir simulation model.

3. The method of claim 1, wherein the lithotypes comprise boundstone, grainstone, rudstone, packstone, wackestone, and mudstone.

4. The method of claim 1, wherein the GDE map comprises a description of an environment of deposition at a geological time of deposition based, at least in part on the lithology map.

5. The method of claim 1, wherein the paleo-bathymetric map is based, at least in part, on surfaces interpreted within a seismic image.

6. The method of claim 1, wherein the lithology map is based, at least in part, on well logs, or other subsurface logs, and core samples taken from a plurality of wells penetrating the subsurface formation.

7. The method of claim 3, wherein boundstone is assigned a mobility index less than grainstone, and grainstone is assigned a mobility index less than packstone, and packstone is assigned a mobility index less than wackestone, and wackestone is assigned a mobility index less than mudstone.

8. The method of claim 1, wherein the lithology groups comprise {boundstone}, {grainstone, packstone}, {wackestone, mudstone}, {boundstone, grainstone, packstone, wackestone, mudstone}.

9. A non-transitory computer readable medium storing instructions executable by a computer processor, the instructions comprising functionality for:
   receiving a gross depositional environment (GDE) map of a subsurface region of interest, wherein the GDE map comprises a lithology map of a plurality of lithotypes;
   receiving a paleo-bathymetric map of a subsurface formation;
   assigning an inverse mobility for each of the lithotypes;
   forming a bathymetric vector field based, at least in part, on a gradient of the paleo-bathymetric map;
   receiving at least one lithology group, wherein a lithology group is a set of at least one lithotype;
   for each lithology group:
      generating an inverse mobility map from the lithology map and the assigned inverse mobilities,
      forming an inverse mobility vector field based, at least in part, on the gradient of the inverse mobility map, and
      scaling the inverse mobility vector field based, at least in part, on the paleo-bathymetric map and the inverse mobility map;
   combining, by vector addition, the scaled inverse mobility vector field for each lithology group and the bathymetric vector field to produce a carbonate sediment trajectory field for each lithology group;
   determining an enhanced gross depositional environment map based, at least in part, on the carbonate sediment trajectory field of at least one lithology group;
   determining a subsurface model based, at least in part, on the enhanced gross depositional map;
   planning a location of a well-site and a planned wellbore trajectory based, at least in part, on the subsurface model; and
   drilling a wellbore guided by the planned wellbore trajectory using a drilling system.

10. The non-transitory computer readable medium of claim 9, further comprising instructions for:
    determining a reservoir simulation model based, at least in part, on the enhanced GDE map; and
    simulating a production rate of hydrocarbons from the subsurface formation using a reservoir simulator, based at least in part on the reservoir simulation model.

11. The non-transitory computer readable medium of claim 9, wherein the GDE map comprises a description of an environment of deposition at a geological time of deposition based, at least in part on the lithology map.

12. The non-transitory computer readable medium of claim 9, wherein the paleo-bathymetric map is based, at least in part, on surfaces interpreted within a seismic image.

13. The non-transitory computer readable medium of claim 9, wherein the lithology map is based, at least in part, on well logs, or other subsurface logs, and core samples taken from a plurality of wells penetrating the subsurface formation.

14. The non-transitory computer readable medium of claim 9, wherein the lithology groups comprise {boundstone}, {grainstone, packstone}, {wackestone, mudstone}, {boundstone, grainstone, packstone, wackestone, mudstone}.

15. A system, comprising:
- a computer comprising one or more computer processors and a non-transitory computer readable medium, configured to:
  - obtain a gross depositional environment (GDE) map of a subsurface formation, wherein the GDE map comprises a lithology map of a plurality of lithotypes,
  - obtain a paleo-bathymetric map of the subsurface formation,
  - obtain an inverse mobility for each of the lithotypes,
  - form a bathymetric vector field based, at least in part, on a gradient of the paleo-bathymetric map,
  - receive at least one lithology group, wherein a lithology group is a set of at least one lithotype,
  - for each lithology group:
    - generate an inverse mobility map from the lithology map and the inverse mobilities;
    - form an inverse mobility vector field based, at least in part, on the gradient of the inverse mobility map; and
    - scale the inverse mobility vector field based, at least in part, on the paleo-bathymetric map and the inverse mobility map,
  - combine, by vector addition, the scaled inverse mobility vector field for each lithology group and the bathymetric vector field to produce a carbonate sediment trajectory field for each lithology group,
  - determine an enhanced gross depositional environment map based, at least in part, on the carbonate sediment trajectory field of at least one lithology group, and
  - determine a subsurface model based, at least in part, on the enhanced gross depositional map;
- a wellbore planning system configured to plan a well-site location and a wellbore trajectory using based, at least in part, on the subsurface model; and
- a drilling system, configured to drill a wellbore guided by the planned wellbore trajectory.

\* \* \* \* \*